Feb. 8, 1938.  H. J. MARLOWE  2,107,447
EXERCISING MACHINE
Original Filed July 3, 1934
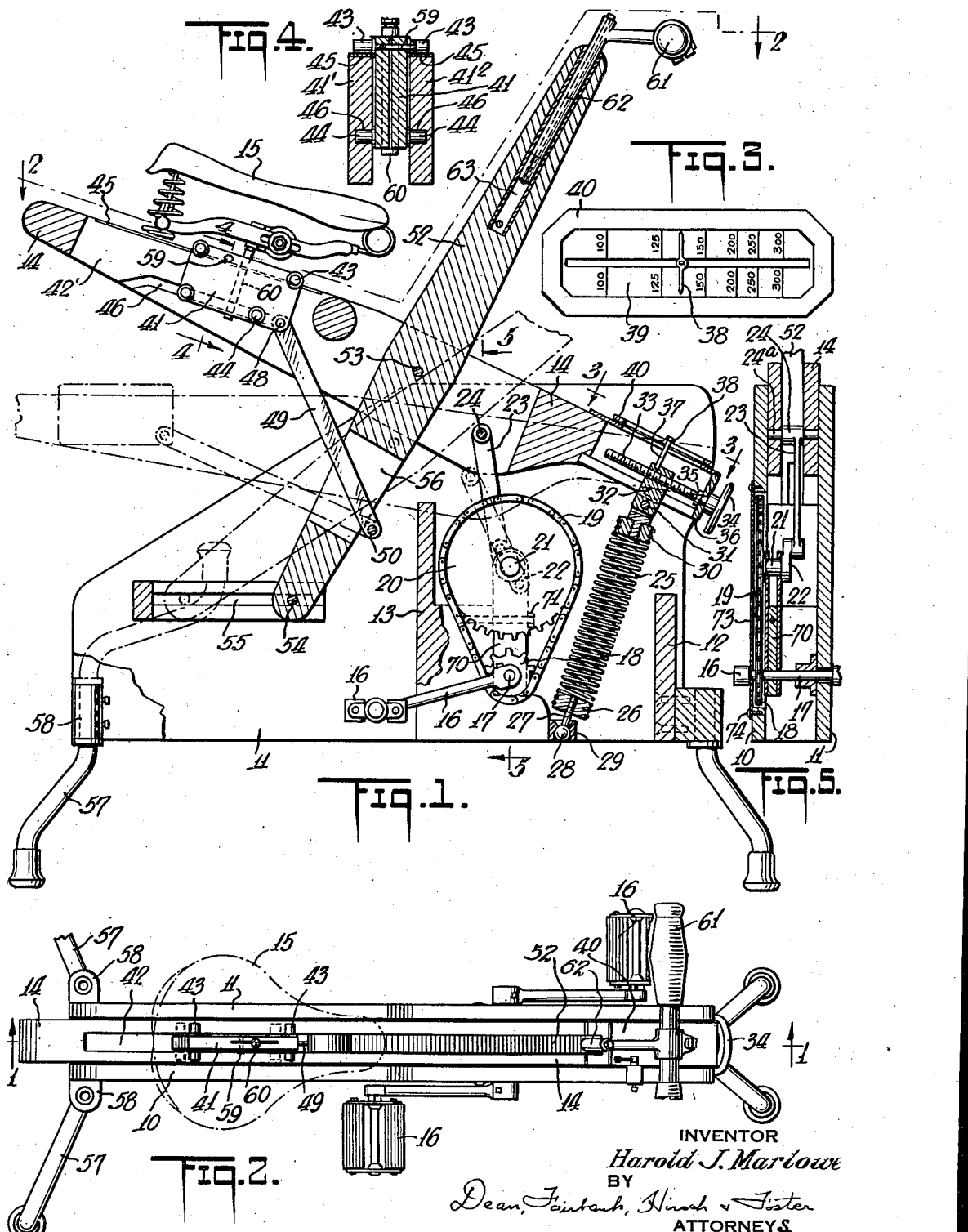
INVENTOR
Harold J. Marlowe
BY
Dean, Fairbank, Hirsch & Foster
ATTORNEYS Patented Feb. 8, 1938

2,107,447

UNITED STATES PATENT OFFICE 2,107,447

EXERCISING MACHINE

Harold J. Marlowe, New Rochelle, N. Y., assignor to Marlowe Products Inc., New York, N. Y., a corporation of Delaware Application July 3, 1934, Serial No. 733,546
Renewed May 13, 1937

8 Claims. (Cl. 272—73)

My present invention is concerned with exercising machines and has among its objects to provide a simple and rugged device, which serves effectively to exercise those muscles commonly used in bicycle riding, as well as those used in horseback riding and also those used in operating a rowing machine, which device requires no electric motor or other power device and yet affords in the normal operation thereof, alternate periods of physical exertion and relief.

Another object is to provide a device of the above type, by which complicated relative movements of the feet, hands and body of the user are effected in operation, yet without resort to elliptical or circular gearing, or racks or pinions or other like machine elements, that, aside from their cost, are subject, on the one hand, to becoming jammed or, that, on the other hand, require lubrication service.

Another object is to provide a machine of the above type, which admits of ready and convenient separate adjustment for the length of the user's legs, for the length of his arms and for his weight.

Another object is to provide a machine of the above type, which though vigorously operated, will not cause any injury to the floor, rug, or other support, on which it may stand when used in any ordinary room of a dwelling.

Another object is to provide a device of the above type, which while of impressive appearance may be inexpensively produced entirely out of wood, except for a few simple metal elements.

In a specific embodiment, the invention comprises a support frame or base having a seat carrying bar longitudinally thereof, pedal operated means being connected to the bar to give the latter a complicated motion against the resistance of a coil spring adjustable in accordance with the weight of the user.

According to another feature, the device has a hand rest bar pivoted to the seat carrying bar, on which latter the seat is positively slid back and forth during use by link connection to the frame.

In the accompanying drawing in which is shown one of various possible embodiments of the several features of the invention:—

Fig. 1 is a view in longitudinal cross-section through the machine,

Fig. 2 is a sectional view taken on line 2—2 of Fig. 1,

Fig. 3 is a detail view on line 3—3 of Fig. 1,

Fig. 4 is a sectional detail view on line 4—4 of Fig. 1, and

Fig. 5 is a view in longitudinal section on line 5—5 of Fig. 1.

Referring now to the drawing, the device includes a support base or frame including a pair of side wall members, preferably wooden, shown at 10 and 11, rigidly connected by cross piece 12 and cross-block 13. A longitudinal wooden bar 14 extends with small clearance between the two side wall members of the frame, and above the cross members 12 and 13, said bar carrying a seat 15 thereon to be described presently. Bar 14 is operated from the frame by a pedal device including a pair of ordinary bicycle pedals 16 exposed at opposite walls of the frame and connected by a cross shaft 17 mounting a pinion 18, which, in turn, is connected by a sprocket chain 19, to a sprocket wheel 20 pivoted on axle 21 between the two walls of the frame. The sprocket pinion and wheel are mounted and have their bearings in a metal support bar 70 secured to the cross-block 13 of the frame by one or more bolts 71. The sprocket wheel has a crank arm 22 connected by a crank link 23 to the seat carrying bar 14 which is cut away as shown to accommodate the wrist pin 24 bearing at its opposite ends 24a in the member 14. A metal plate 73 affixed by screws 74 to the outer side of the frame piece 10 conceals the sprocket mechanism from view.

The movement of the seat and its bar is resiliently resisted preferably by means of a powerful coil spring 25 seated on a spring rest 26 rigidly connected by stud 27 having a ball head 28 resting in a corresponding ball socket 29 near the lower end of the frame. The upper end of the spring 25 has a rest 30 connected by a pivot pin 31 to a metal block 32 through which extends a threaded shank 33 having a hand wheel 34 rigidly affixed to the forward end thereof, and retained by a nut 35 against longitudinal movement relative to the forward end of the seat carrying bar 14. Preferably the forward end of the wooden seat carrying bar has a downwardly extending metal plate 36 rigidly affixed thereto, through which the forward end of the shank 33 extends and against which nut 35 reacts.

In rotating the hand wheel 34, the block 32 is shifted toward or away from the hand wheel as the case may be, for adjustment to the weight of the user. Preferably, the block 32 has an upstanding pin 37 mounting a pointer 38 which indicates the setting of the spring by reading on a scale 39 mounted in a frame 40, over the forward end of the seat bar 14, and preferably calibrated approximately in accordance with the weight of the user.

The pivot 24 which has but a small orbit of movement, is, in effect, the fulcrum of lever 14 and the nearer block 32 is to hand wheel 34, the more force must, therefore, be applied through seat 15 to overcome spring 25, as appears from the calibrations on scale 30.

Preferably the seat has a fin member 41 extending thereunder into a longitudinal opening 42 in seat carrying bar 14. The fin 41 has rollers 43 and 44 protruding from opposite ends thereof, the upper of which rollers is slidable along sheet metal tracks 45 on the seat carrying bar and the lower of which is slidable in grooves 46 formed in the walls 42' of opening 42, in the seat carrying bar 14. The forward end of the plate fin 41 has pivotally connected thereto at 48, the upper end of link 49, the lower end of which is pivotally connected preferably by a cross rod 50 affixed between the side walls of the frame or base.

Preferably, the longitudinal opening 42 extends the major portion of the length of bar 14, as shown in Figs. 1 and 2. Through said opening, there extends a handle mounting bar 52, pivotally connected at 53 to the seat carrying bar 14 and having a pivot 54 at its lower end movable along a horizontal track conformation 55 in the side frames 10 and 11. As shown, the bar 52 has an opening 56 therein, to accommodate the seat operating link 49.

Preferably, legs 57 are fixed in sockets 58 near the ends of the lower edge of the side frames to support the machine with its frame well above the floor, thereby to afford ample clearance for movement of the pedals 16. These legs 57 are preferably removable from their respective sockets for insertion in said sockets in inverted position, as indicated in dot and dash lines at the left end of Fig. 1, to save space in shipment of the device.

Preferably the seat is adjustable in height to the length of the user's legs. For this purpose, the guide fin 41 is made of two parallel plates 41' and 41², releasably clamped together by clamp screw 59, to rigidly hold in fixed position in corresponding grooves therebetween a pin 60 rigid with the seat 15. By loosening the screw 59 the pin may be released and adjusted in its grooves, to any desired height of seat and there retained by re-tightening said screw 59.

Similarly, the handle bar 61, which is similar to a bicycle handle bar and extends transversely across the upper end of mounting bar 52 is fixed to the end of a rod 62 which is slidably adjustable in a socket 63 longitudinally of the bar 52 and may be there affixed by the conventional means used on bicycles, at any desired elevation, in accordance with the arm length of the user.

For use of the exercising machine, the seat 15 and handle bars 61 are adjusted to the size of the user, and the handwheel 34 to his weight. The user now mounts the device as he would a bicycle, placing his feet on the pedals 16, grasping handles 61 and then operates the pedals as he would those of a bicycle. In this operation, the pivoted end 24 of the crank 22, 23, moves through a short closed path, imparting a corresponding movement to that portion of the seat bar 14, against the resistance of spring 25, which is extended, while correspondingly rocking on the ball and socket support 28—29, to maintain its axis in a straight line throughout operation. The rear end of the seat carrying bar moves through a course, much more ample than that of fulcrum 24, partaking, as is obvious both of an up and down rocking and a backward and forward complex oscillating movement. Since the seat 15 is connected by link 49 to the frame, this seat will partake not only of the primary complicated motion of the bar which carries it, but will independently thereof be slid forward and backward along said bar, performing a complete cycle of movement, for each complete revolution of the pedals.

At the same time, the handle bar 61 is caused also to perform a complex motion determined by the movement of cross pin 53 with the seat bar, but this motion is quite different from that of the seat carrying bar 14, by virtue of the sliding of the lower end of said handle bar along slotted guides 55.

In vigorous pedaling operation, there occurs movement of the seat and handle bars alternately of relative approach and relative recession. These alternate movements are, however, not caused by equal effort, considerable effort being exerted through one half of the pedal rotation to stress the spring 25 during the correspondingly forced coordinated movements of the body, legs and arms and during the rest of the pedal cycle, the stressed spring 25 is released, giving up its stored energy and affording relief to help the operator bring the seat and handles toward each other. By the use of this machine, various leg, arm and stomach muscles are thus exercised, by vigorous stretching and bending with alternations of effort and relief. It is seen that the machine affords exercise not only to those muscles used in bicycle riding, but also to those used in horseback riding, as well as to those used in operating a rowing machine.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent is:—

1. An exercising machine comprising a support base, a handle bar and a seat bar hingedly connected together, a seat slidable along said seat bar and having a linkage connection to said base, a pedal device having a linkage connection with respect to said seat bar, resilient means storing energy at one phase of the operation of said pedal and releasing said energy at another phase thereof to cause movement of said bars and sliding of said seat with alternations of resistance and relief in the operation of the device.

2. An exercising machine comprising a frame having side walls, a seat carrying bar extending between said walls, longitudinally thereof, a pedal operated crank linkage connected to a contiguous part of said bar, a coil spring near the forward end of the bar and connecting said frame to said bar, means for adjusting the tension of said spring in accordance with the weight of the user, and means for resting the hands of the user, said spring having at the lower end thereof, a universal connection to the frame, and having a slide block at the upper end thereof, and a hand wheel having a threaded shank for shifting the slide block longitudinally of the bar to adjust the tension of the spring.

3. The combination set forth in claim 2 in which the slide block has a pointer secured thereto and extending above a scale having graduations proportioned to the weight of the user.

4. An exercising machine comprising a base, a bar longitudinally thereof, having a seat slidably mounted thereon, a hand support, a pedal operated member carried by said base, linkage connecting said sliding seat to said base, a spring resisting displacement of said seat carrying bar and a linkage connection from said pedal operated member to said seat bar to move the latter through a complex displacement including a forward and backward, as well as an upward and down component of motion, while the seat slides forward and backward along said moving bar.

5. In an exercising machine, the combination of a seat carrying bar, a seat construction having a guide fin extending into a corresponding longitudinal slot of said bar, support rollers across said fin, tracks on said bar for said rollers, said fin comprising two plates, a rod rigid with said seat extending between said two plates and means for releasably clamping said rod in selected position.

6. An exercising machine including a pedal, a sliding seat having a support therefor, a handle bar, means interlinking said pedal with said seat support and said handle bar to cause said latter elements to move in generally opposed directions under operation of the pedal, and a spring associated with said parts alternately to resist and help the movement in the opposite phases of the pedal motion.

7. The combination set forth in claim 6, in which the height of the seat and of the handle bar are adjustable to the size of the user, and the setting of the spring is adjustable to the weight of the user.

8. An exercising machine including a frame, a moving seat and a moving handle bar carried by said frame, a pedal operated device mounted near the lower part of said frame, legs on said frame supporting the latter above the floor and affording clearance for the pedal movement, said legs having socket supports and being removable therefrom for mounting therein in reverse position for compactness of the device in shipment.

HAROLD J. MARLOWE.